United States Patent
Haga

(10) Patent No.: US 10,955,785 B2
(45) Date of Patent: Mar. 23, 2021

(54) IMAGE FORMING DEVICE, INSPECTION DEVICE, AND NON-TRANSITORY COMPUTER-READABLE STORAGE MEDIUM STORING PROGRAM

(71) Applicant: Konica Minolta, Inc., Tokyo (JP)

(72) Inventor: Tatsuyoshi Haga, Hachioji (JP)

(73) Assignee: Konica Minolta, Inc., Tokyo (JP)

(*) Notice: Subject to any disclaimer, the term of this patent is extended or adjusted under 35 U.S.C. 154(b) by 190 days.

(21) Appl. No.: 16/033,751

(22) Filed: Jul. 12, 2018

(65) Prior Publication Data

US 2019/0033765 A1 Jan. 31, 2019

(30) Foreign Application Priority Data

Jul. 28, 2017 (JP) .............................. JP2017-146415

(51) Int. Cl.
*G03G 15/00* (2006.01)
*H04N 1/00* (2006.01)

(52) U.S. Cl.
CPC ..... *G03G 15/5062* (2013.01); *H04N 1/00015* (2013.01); *H04N 1/00641* (2013.01)

(58) Field of Classification Search
CPC ........... G03G 15/5062; H04N 1/00015; H04N 1/00641
See application file for complete search history.

(56) References Cited

U.S. PATENT DOCUMENTS

| 6,449,385 B1* | 9/2002 | Huber | B41F 33/0036 101/484 |
| 6,665,424 B1* | 12/2003 | Stringa | G06T 5/006 382/112 |
| 2010/0188501 A1* | 7/2010 | Yagyu | G01N 21/9508 348/128 |

(Continued)

FOREIGN PATENT DOCUMENTS

| JP | 2013216076 | 10/2013 |
| JP | 2014153580 | 8/2014 |

OTHER PUBLICATIONS

Newman et al.; "A Survey of Automated Visual Inspection"; Computer Vision and Image Understanding; vol. 61 Issue 2; Mar. 1995; p. 231-262.

(Continued)

*Primary Examiner* — David H Banh
(74) *Attorney, Agent, or Firm* — Baker Hostetler

(57) ABSTRACT

An image forming device includes: an image forming unit that forms an image on a recording medium; and a controller that controls image formation. The controller can determine whether the image on the recording medium is normal upon reception of a reading result obtained by reading an image on a recording medium that has passed through the image forming unit, and can exercise such control that a recording medium with an image that has been determined to be normal and a recording medium with an image that has been determined to be abnormal are sorted according to a determination result, the controller having a function of, upon (Continued)

such reading, dividing a reading result related to a recording medium and making a determination on an image on the recording medium in accordance with reading results related to segments obtained by division.

18 Claims, 14 Drawing Sheets

(56) References Cited

U.S. PATENT DOCUMENTS

| | | | |
|---|---|---|---|
| 2010/0214560 A1* | 8/2010 | Yagyu | B65G 47/1492 356/237.1 |
| 2012/0182566 A1 | 7/2012 | Sawano | |
| 2013/0164000 A1 | 6/2013 | Nemoto et al. | |
| 2014/0254952 A1* | 9/2014 | Kimiyama | G09G 5/001 382/284 |
| 2015/0281471 A1* | 10/2015 | Huber | H04N 1/00087 382/112 |
| 2017/0069087 A1* | 3/2017 | Naka | G06T 3/4007 |
| 2017/0366709 A1* | 12/2017 | Horita | H04N 1/6005 |
| 2018/0131815 A1* | 5/2018 | Spivakovsky | H04N 1/00037 |

OTHER PUBLICATIONS

Marie Vans et al.; "Automatic visual inspection and defect detection on variable data prints"; Journal of Electronic Imaging; vol. 20(1); 2011; 13 pages.

European Patent Application No. 18181146.4; Extended Search Report; dated Dec. 7, 2018; 10 pages.

China Patent Application No. 201810814954.4; Office Action; dated Nov. 26, 2020; 23 pages.

* cited by examiner

IMAGE FORMING DEVICE, INSPECTION DEVICE, AND NON-TRANSITORY COMPUTER-READABLE STORAGE MEDIUM STORING PROGRAM The entire disclosure of Japanese patent Application No. 2017-146415, filed on Jul. 28, 2017, is incorporated herein by reference in its entirety.

BACKGROUND

Technological Field

The present invention relates to an image forming device, an inspection device, and a non-transitory computer-readable storage medium storing a program, which determine pass/fail of an image in accordance with the reading result related to an image on a recording medium and enable recording medium sorting according to the determination.

Description of the Related Art

In the field of image forming devices, such as copiers, printers, and multi-function printers, judgement is performed for image abnormality and image quality adjustment in accordance with the results of reading images on sheets. For example, a device has been proposed which performs a comparison between a read image and image data to be printed or a read image that has been determined to be normal, determines that it is normal if the images match, and determines that it is abnormal if the images do not match. Paper with an image determined to be abnormal is regarded as a waste and waste paper is ejected to a tray different from a normal paper output tray (see Japanese Patent Laid-Open No. 2014-153580, for example).

By the way, in an image forming device, when a print sheet read by an image reading unit and determined to be a waste should be ejected to a different tray (e.g., a purge tray) by transport path switching and the print sheet is a long-length sheet, it is possible that an end of the sheet is already ahead of a branch point to the different tray at the point when it is determined to be a waste, so that paper output tray switching is delayed and it cannot be ejected to the different tray.

As a countermeasure, Japanese Patent Laid-Open No. 2013-216076, for example, proposes an image forming system in which a sheet that has passed the image reading unit is temporarily led to a flipping transport path for a detour so that the switching can be completed in time.

However, the image forming system disclosed in Japanese Patent Laid-Open No. 2013-216076 requires a flipping transport path to be additionally provided, which is disadvantageous in that it increases device cost and device size.

SUMMARY

An object of the present invention, which has been made in the aforementioned background, is to provide an image forming device, an inspection device, and a non-transitory computer-readable storage medium storing a program that prevent an increase in device size due to addition of a flipping transport path and allow recording medium undergone image determination to be sorted.

To achieve at least one of the abovementioned objects, according to an aspect, an image forming device reflecting one aspect of the present invention includes:

an image forming unit that forms an image on a recording medium; and a controller that controls image formation, wherein the controller is capable of determining whether the image on the recording medium is normal upon reception of a reading result obtained by reading an image on a recording medium that has passed through the image forming unit, and capable of exercising such control that a recording medium with an image that has been determined to be normal and a recording medium with an image that has been determined to be abnormal are sorted according to a determination result, the controller having a function of, upon such reading, dividing a reading result related to a recording medium and making a determination on an image on the recording medium in accordance with reading results related to segments obtained by division.

To achieve at least one of the abovementioned objects, according to an aspect, an image inspection device reflecting one aspect of the present invention includes:

an inspection controller that determines, in accordance with a reading result obtained in an image reader that reads an image on a recording medium, whether the image on the recording medium is normal, wherein the inspection controller can exercise such control that a recording medium with an image that has been determined to be normal and a recording medium with an image that has been determined to be abnormal are sorted according to a determination result, the inspection controller having a function of, upon such reading, dividing a reading result related to a recording medium and making a determination on an image on the recording medium in accordance with reading results related to segments obtained by division.

To achieve at least one of the abovementioned objects, according to an aspect, a non-transitory computer-readable storage medium reflecting one aspect of the present invention is a non-transitory computer-readable storage medium storing a program to be executed on a computer that determines whether an image on a recording medium is normal in accordance with a reading result obtained by reading the image on the recording medium through an image reader, wherein the program causes the computer to perform:

judging whether the reading result related to the recording medium needs to be divided, dividing the reading result into multiple reading results when division needs to be performed according to the judgement, making a determination on the image on the recording medium in accordance with the reading results obtained after division, and exercising such control that, a recording medium with an image that has been determined to be normal and a recording medium with an image that has been determined to be abnormal are sorted depending on the result of the determination.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, an embodiment of the present invention will be described with reference to the drawings. However, the scope of the invention is not limited to the disclosed embodiments.

One embodiment of image forming device of the present invention will now be described.

Figure 1:
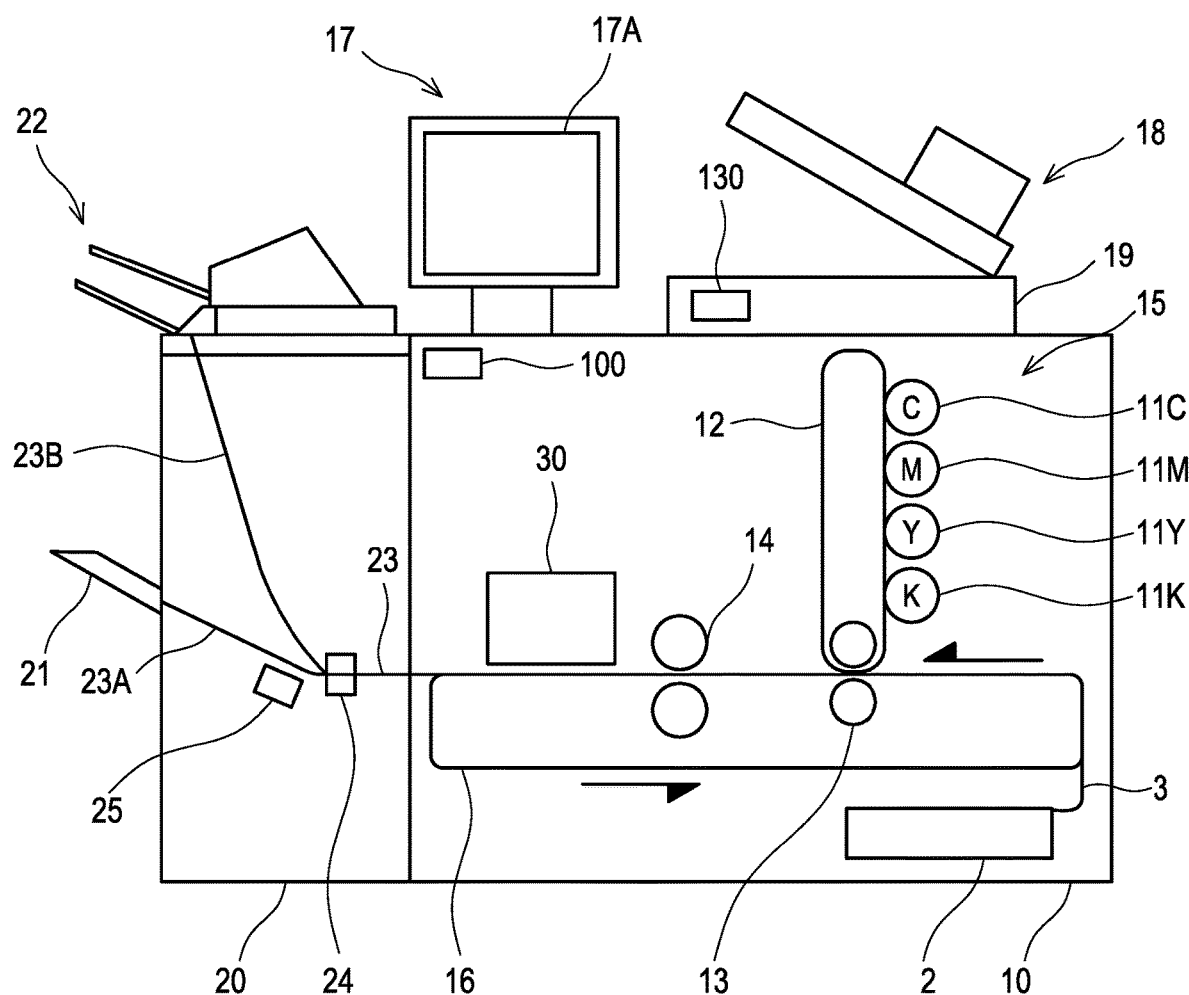
FIG. 1 is a schematic mechanical diagram showing an image forming device of one embodiment of the present invention.

As shown in FIG. 1, an image forming device 1 includes a device body 10, which contains an image reading unit 30, and a postprocessing device 20 that performs postprocessing on sheets. These devices are electrically and mechanically connected to each other so that information communication can be established between the devices and sheets can be transferred between the devices. It should be noted that a relay device or other appropriate devices can be provided between the device body 10 and the postprocessing device 20.

Although these devices constitute the image forming device 1 in this embodiment, the configuration of an image forming device of the present invention is not limited to this. For example, a device body, which does not include an image reading unit, and a reading device including an image reading unit can be included in the image forming device; alternatively, only a device body can constitute the image forming device, and the image forming device provided with a reading device, a postprocessing device, a large-capacity sheet feeder, and the like can constitute an image forming system. Alternatively, the image forming device and the reading device can be in the mechanically off-line relationship. The image forming device and the reading device can be in the electrically in-line relationship. Alternatively, reading results can be sent to the image forming device in the electrically off-line state in an appropriate manner. Alternatively, the reading results provided by the reading device are not sent to the image forming device but to a management device or the like.

The device body 10 has an in-body sheet feeder 2 in the lower part within its housing. The in-body sheet feeder 2 contains sheets and the sheets in the in-body sheet feeder 2 are transported to the transport path 3. A sheet corresponds to a recording medium of the present invention. It should be noted that, in the present invention, the material for the recording medium is not limited to paper and can be a cloth, a plastic material, or the like. In addition, a recording medium of the present invention can be prepared by cutting a continuous recording medium, such as a continuous sheet of paper, before image formation or after image formation. Further, a large-capacity sheet feeder can be provided on the upper side of the device body 10.

Rollers and the like, which are not shown in the drawing, are provided around the transport path 3 in the device body 10, and the transport path 3 carries sheets fed from the in-body sheet feeder 2.

Further, an image forming unit 15 for forming images on sheets is provided in the middle of the transport path 3.

The image forming unit 15 includes photoreceptors 11C (for cyan), 11M (for magenta), 11Y (for yellow), and 11K (for black) prepared for the respective colors (e.g., cyan, magenta, yellow, and black), and a charger, an LD, a developer, a cleaning unit, and the like (which are not shown in the drawing) are disposed around each of the photoreceptors 11C, 11M, 11Y, and 11K. Further, the image forming unit 15 has a midpoint transfer belt 12 in such a position that it can come in contact with the photoreceptors 11C, 11M, 11Y, and 11K prepared for the respective colors. The midpoint transfer belt 12 comes in contact with a sheet on the transport path 3 through a secondary transfer unit 13 provided in the middle of the midpoint transfer belt 12. The transport path 3 is provided with a fixer 14 in the downstream of the secondary transfer unit 13. These components constitute the image forming unit 15.

In the case where an image is formed on a sheet, the photoreceptors 11C, 11M, 11Y, and 11K charged through chargers are irradiated with laser light through LDs to form a latent image, and the latent image formed on the photoreceptors 11C, 11M, 11Y, and 11K becomes a toner image through the act of the developer. The toner image formed on the photoreceptors is transferred to the midpoint transfer belt 12, and the transferred image is transferred to a sheet by the secondary transfer unit 13. The fixer 14 then fixes the image on the sheet.

An inverted transport path 16, which is in the downstream of the fixer 14 and has a flipping unit, is branched from the transport path 3, and the front end of the inverted transport path 16 meets the transport path 3 at a point in the upstream of the image forming unit 15.

A sheet carried to the inverted transport path 16 is flipped by the flipping unit and meets the transport path 3 at a point in the downstream of the transport flow. When sheet flipping is not necessary, the sheet is not sent to the inverted transport path 16 but directly sent to the postprocessing device 20.

The image reading unit 30 that reads an image on the top surface of a sheet carried along the transport path 3 is disposed between the fixer 14 and a point where the inverted transport path 16 branches from the transport path 3. For a recording medium having an image on its back after being flipped through the inverted transport path 16, the image reading unit 30 reads the image on the back of the medium. The image reading unit 30 corresponds to an image reader of the present invention.

The device body 10 includes an operation display unit 17 on its housing. The operation display unit 17 has a touch screen LCD 17A and an operation key group, such as a ten-key numeric pad, not shown in the drawing, so that it can display information and receive operational inputs.

The device body 10 further includes an automatic document feeding device (ADF) 18 above its housing. The automatic document feeding device (ADF) 18 automatically feeds a document placed on a document table, and the document fed by the automatic document feeding device (ADF) 18 is read by a scanner unit 130. It should be noted that the document can also be read through a platen glass 19.

The device body 10 includes a control unit 100. The control unit 100 controls the entire image forming device 1 and includes a CPU, a program executed by the CPU, and a storage containing parameters and the like and serving as a work area. The control unit 100 corresponds to a controller of the present invention. It should be noted that the control unit can be provided out of the device body. The control unit 100 can acquire reading results obtained by the image reading unit 30 which will be described later.

Image data acquired by image reading through the image reading unit 30 is transmitted to the control unit 100, and the control unit 100 can perform various types of processing based on the acquired image data, adjustment of the image forming unit 15, and the like.

The image reading unit 30 consists of a CCD sensor, CMOS sensor, or the like, and can read an image that lies in the entire width of a sheet. It should be noted that, in the present invention, the structure of the image reading unit 30 is not limited to a particular structure; for example, a colorimeter that measures color by reading an image at a point can be used without limiting the structure of the image reading unit to a particular one. Further, there is no limitation on the number of image reading units. The transport path 3 is connected to the transport path 23 in the postprocessing device 20 in the subsequent stage.

The aforementioned control unit 100 can determine whether a read image is normal or abnormal by using the reading result obtained by the image reading unit 30 as a test image. A switching unit 24 which switches the sheet destination between a transport path 23A and a transport path 23B enables sheet sorting depending on image normality or abnormality. In this embodiment, sorting refers to selecting different transport destinations. Regarding waste determination, a determination content can be set in advance depending on the inspection item, inspection target (e.g., size and image), criteria for determination, and the like for waste inspection. The control unit 100 exercises such control that if the image is determined to be normal, the sheet is ejected to a first output tray 21, and if the image is determined to be abnormal, the sheet is ejected to a second output tray 22.

Image data serving as a reference for determination of normality or abnormality of the image can be acquired from RIP data in the control unit 100 or can be reference data made from the reading results which are output upon sample output and stored in a memory in the image reading device or device body.

The control unit 100 can perform a comparison between reference data and image data read by the image reading unit and determine whether the image is normal or abnormal. For example, if they match, the image is determined to be normal, and if they do not match, the image is determined to be abnormal. Criteria for determination of normality or abnormality can be set as appropriate. A determination can be made according to set criteria for determination.

The postprocessing device 20 includes the transport path 23 that can cam/sheets. The transport path 23 branches into the transport path 23A and the transport path 23B through the switching unit 24. The transport path 23A is connected to the first output tray 21, and the transport path 23B is connected to the second output tray 22.

A postprocessing unit 25 is provided in the middle of the transport path 23A to the first output tray 21. The postprocessing unit 25 can execute predetermined postprocessing. Examples of postprocessing include stapling, punching, bounding, and other appropriate processing, and postprocessing involving folding for making a tri fold, saddle stitch, Z fold, gate fold, French fold, and the like. The postprocessing unit 25 can perform more than one types of postprocessing. The switching unit 24 switches the sheet destination between the transport path 23A and the transport path 23B. It should be noted that the output trays are not necessarily provided to the postprocessing device and can be provided to the device body; alternatively, different output trays can be provided to different devices.

Although the aforementioned embodiment is based on the premise that multicolor images are formed, the image forming device can form monochrome images.

Figure 2:
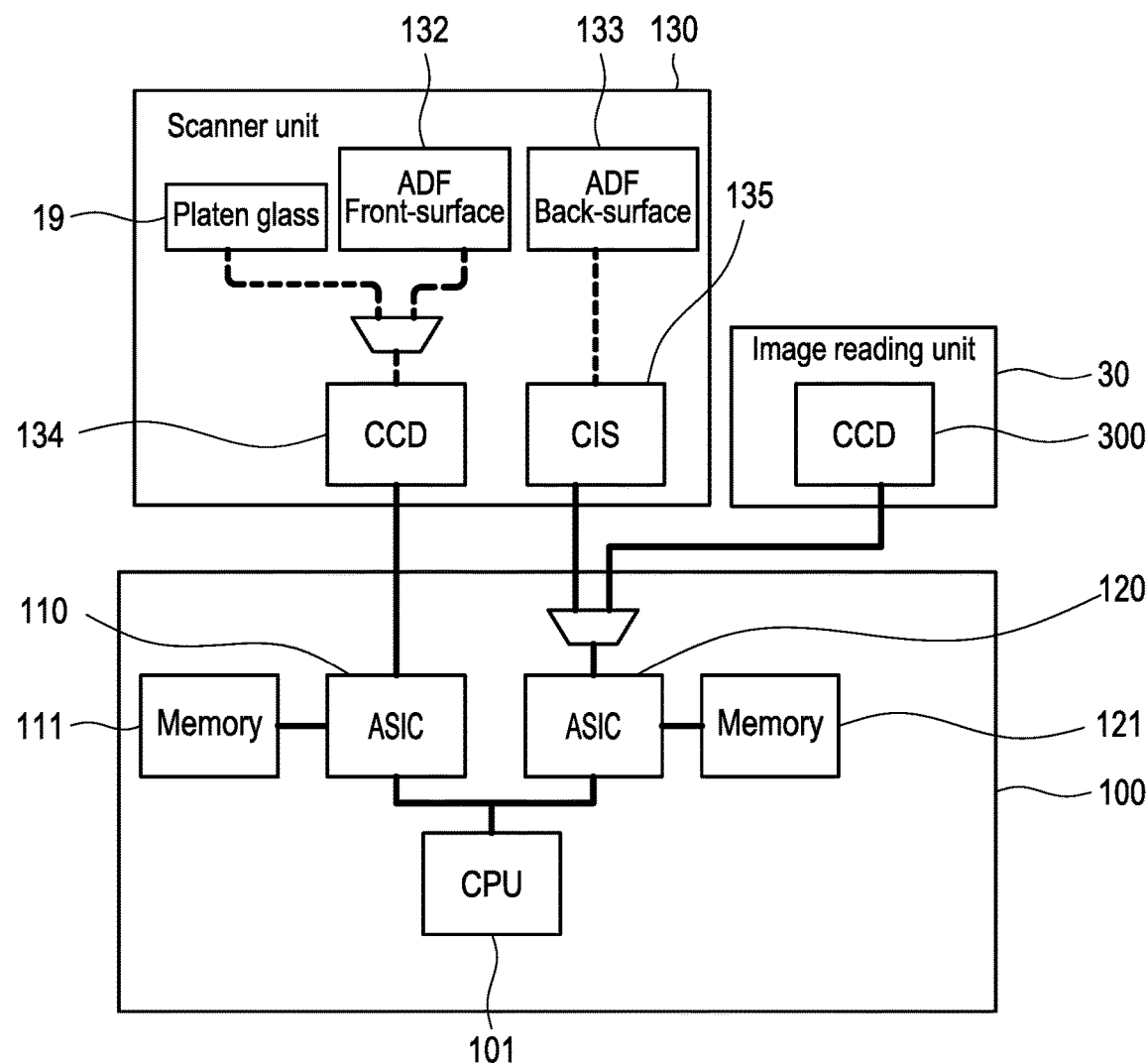
FIG. 2 is a diagram showing part of the substrate configuration of the image forming device of the embodiment.

FIG. 2 is a schematic diagram showing a control board that is intended mainly for image reading and is included in the image forming device 1.

The scanner unit 130 includes a platen glass 19, an ADF front-surface reading unit 132, and an ADF back-surface reading unit 133. The platen glass 19 and the ADF front-surface reading unit 132 are configured to allow for image reading through a CCD 134, and the ADF back-surface reading unit 133 is configured to allow for image reading through a CIS 135. In addition, the image reading unit 30 includes a CCD 300.

The CCD 134 is connected to an ASIC 110, and the ASIC 110 is connected to a memory 111 and a CPU 101.

Further, the CIS 135 and the CCD 300 are connected to an ASIC 120, and the ASIC 120 is connected to a memory 121 and a CPU 101.

The CPU 101 controls the entire image forming device 1 by executing a predetermined program.

In this embodiment, the CPU 101, the ASIC 110, the memory 111, the ASIC 120, and the memory 121 constitute the control unit 100.

In the control unit 100, the output of the CCD 134 is received at the ASIC 110 and is subjected to analog signal processing, analog to digital (A/D) conversion, shading, and other various reading processing. Processed image data is stored in the memory 111 as a document image and can undergo, for example, reading through the ASIC 110 under control by the CPU 101.

In addition, the outputs of the CIS 135 and the CCD 300 are received at the ASIC 120 and is subjected to analog signal processing, analog to digital (A/D) conversion, shading, and other various reading processing. Processed image data is stored in the memory 121 as a document image or detected image and can undergo, for example, reading through the ASIC 120 under control by the CPU 101.

In addition, the memory 111 and the memory 121 can store a reference image for determination of whether the image is normal or abnormal. Information on the reference image can be held in advance in an HDD or the like in the memory 111 and the memory 121 in the image forming device 1 in a nonvolatile manner or can be acquired via a network, a detachable USB memory, or the like. Alternatively, it can be a document image acquired via a network, a detachable storage medium, or the like (print in).

Figure 3:
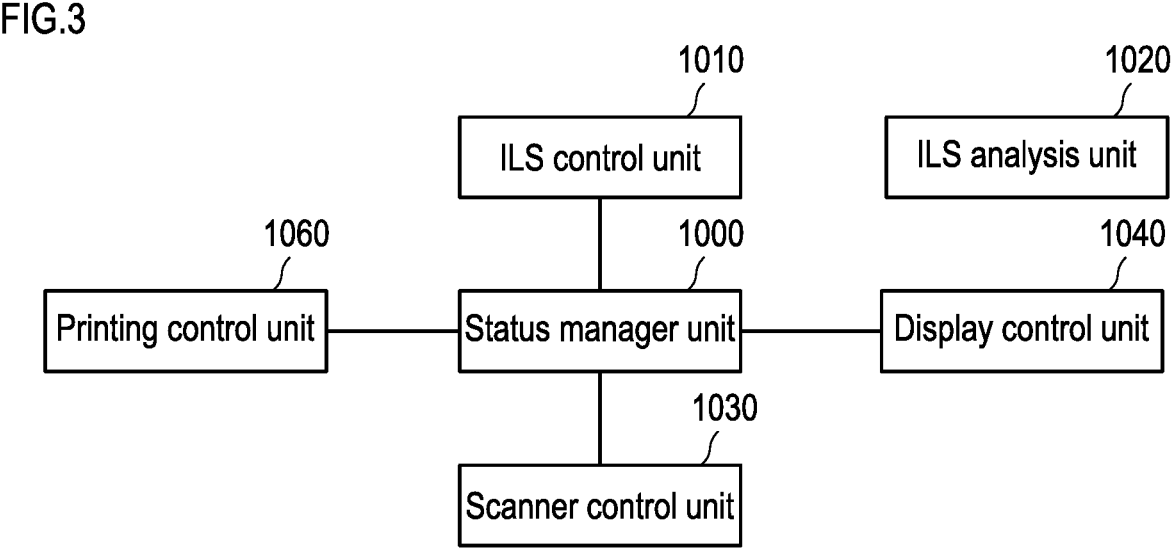
FIG. 3 is a block diagram of a control unit of the embodiment.

FIG. 3 shows a function block in the control unit 100.

A status manager unit 1000 controls the entire image forming device 1 and grabs the status of the entire image forming device 1. The status manager unit 1000 is connected to a scanner control unit 1030 in such a manner that it can be controlled. When the scanner unit 130 needs to read an image, the status manager unit 1000 issues an instruction to the scanner control unit 1030 to operate the CCD 134 and the CIS 135, so that the image of the document is read. The read image data in the status manager unit 1000 is subjected to reading processing or stored in a memory as a document image.

The status manager unit 1000 is connected to a display control unit 1040 in such a manner that it can be controlled. In this embodiment, to display information on the operation display unit 17, the status manager unit 1000 sends a control instruction to the display control unit 1040, and under control by the display control unit 1040, desired presentation is made on the operation display unit 17. Further, upon an operation through the operation display unit 17, the operation is transmitted to the status manager unit 1000 through the display control unit 1040, and the status manager unit 1000 exercises control according to the operation.

In addition, the status manager unit 1000 is connected to a printing control unit 1060 in such a manner that it can be controlled. The printing control unit 1060 controls printing, sheet transport, and the like in the image forming unit 15. In the status manager unit 1000, to perform printing, a print image intended for printing is acquired to prepare write information which is sent to the printing control unit 1060, and the printing control unit 1060 performs a printing operation.

Further, the status manager unit 1000 is connected to an ILS control unit 1010 in such a manner that it can be controlled. When an image printed on a sheet needs to be read, the status manager unit 1000 sends an instruction to the ILS control unit 1010 and the CCD 300 reads the image printed on the sheet. Read image is transmitted to an ILS analysis unit 1020 where image data is analyzed and color information and positional (coordinates) information about the pixels used in it are extracted. Acquired information is fed out to the status manager unit 1000 as a detected image.

It should be noted that image detection by the image reading unit 30 can be executed according to user's designation, job conditions, and the like. Image detection can be executed according to conditions, such as detection/no-detection, settings for a detection content, and the order of processing of multiple detection contents, and these conditions can be stored in a nonvolatile memory, HDD, or the like. These conditions can differ depending on the job, and job settings can include these conditions. These settings can be set by the user, for example, through the operation display unit 17. As explained later, a division number, division positions, settings, setting conditions for setting them, and the like related to division of the image reading result for determination can be stored in a nonvolatile memory, HDD, or the like.

The status manager unit 1000 can determine the pass/fail of a printed image by using information about a detected image, information about an image to be printed, a read image such as a sample output, and the like obtained through the image reading unit 30.

Although the device body 10 includes a control unit in the aforementioned embodiment, the control unit can be provided out of the device body 10. In addition, in the case where the postprocessing device, for example, includes an image reading unit, image information obtained by an image reading unit out of the device body is received by the control unit in the image forming device 1.

In the case where the postprocessing device includes an image reading unit, a control unit that performs a comparison between images for waste determination can be provided in the postprocessing device. In this case, the control unit can perform a comparison between images for determination by obtaining information about an image to be printed from the image forming device. The results of comparison determination can be fed out to the image forming device, and sheet sorting can be performed according to the results.

Further, the control unit can be connected to the image forming device, the postprocessing device, the reading device, and the like via a network or the like, thereby constituting the image forming system. It is acceptable that the image forming device, the postprocessing device, and the reading device are not included in the image forming system. This control unit can acquire information about an image to be printed and information about a detected image via a network or the like and perform a comparison between images for determination. In the case where a control unit is present in an image reading device out of the image forming device, a server that manages the image forming device, or the like, the control unit corresponds to an inspection controller of the present invention and the image reading device and the server correspond to image inspection devices of the present invention.

A program executed in a control unit, an inspection controller, or the like corresponds to a program of the present invention, and a control unit and an inspection controller each correspond to a computer of the present invention. Programs, parameters, and the like can be stored in a nonvolatile memory, a ROM, and other memories, or an HDD. A program can be stored in a storage in a server, other storages connected to a network, a removable medium connected to the image forming device 1; thus, in the present invention, a program or the like can be stored in any place. A program of the present invention can be stored in a portable storage when distributed or moved, or stored in a storage in a control unit via a network or the like.

A content will now be described in which an image on a recording medium is read and waste determination is performed.

Figure 4:
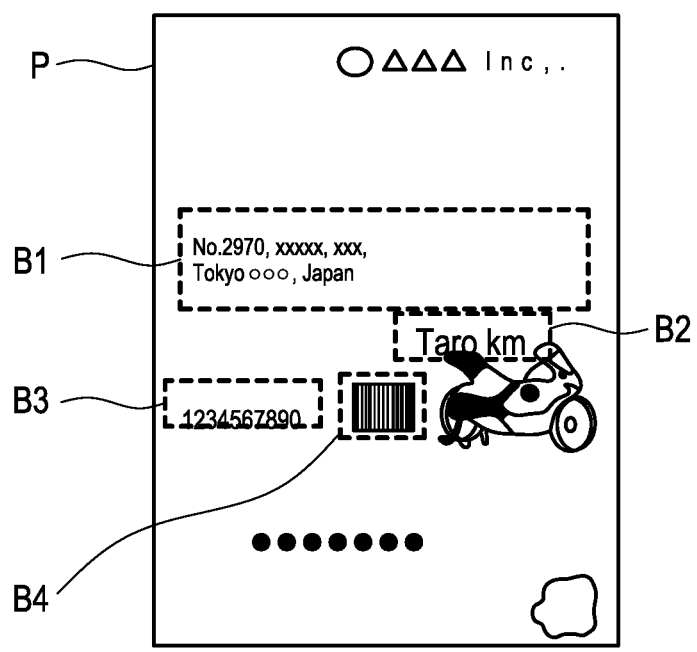
FIG. 4 is a diagram for explaining an example sheet with variable printing.

FIG. 4 shows an example sheet to be subjected to image reading. A sheet P has designated variable printing areas which are variable printing areas B1, B2, B3, and B4. The remaining master area for a common image and a variable area for a variable image use different reference images for waste determination.

Figure 5:
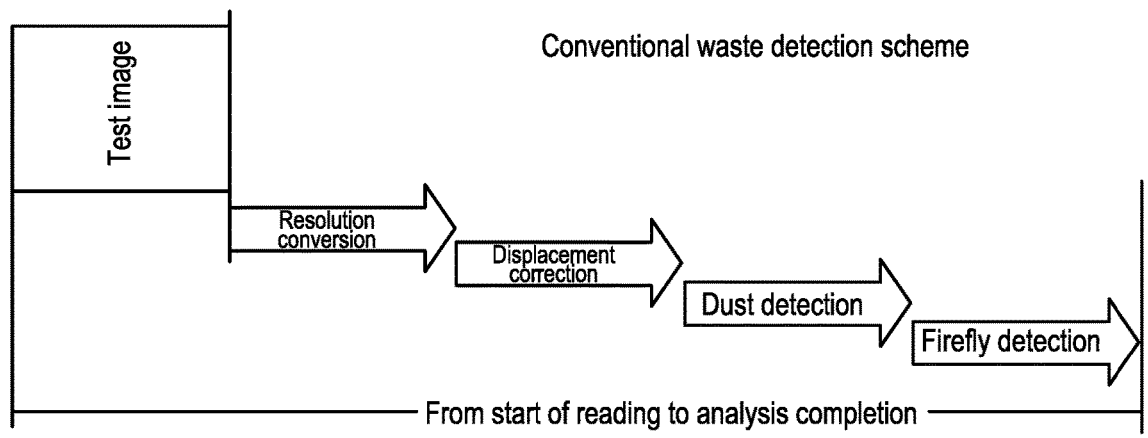
FIG. 5 is a flow diagram showing a procedure of conventional waste determination.

FIG. 5 is a flow diagram showing the process of a conventional method of waste determination for a test image that has undergone image reading.

Upon acquisition of the test image, the control unit performs resolution conversion and lowers the resolution in accordance with the capability of the control unit. It then performs image displacement correction for enabling a comparison with a reference image. It then performs a comparison with a reference image for conducting dust detection and then detects a so-called white patch which is caused by a solid of developer attached to the sheet. As described above, during waste detection, multiple determination contents are sequentially executed. It should be noted that, in the present invention, there is no limitation on the number of processing contents during waste determination and the types of the processing contents, and it is acceptable that only a single detection content is executed.

In the above-described processing, in which reading of an image for inspection is started and, upon completion of reading, waste determination is sequentially performed, the processing time depends on the image reading time. For this reason, if the image area is large or the sheet length in the transport direction is long and it takes time to read the image, the processing time, i.e., the time to the completion of determination is extended. Since sheet sorting is performed according to determination, if the time to the completion of determination is extended, a sheet passes through a sorting point, meaning that it is too late for sorting the sheet.

In this embodiment, the image reading result is divided for waste determination, which shortens the required time. Regarding waste determination, waste determination processing for the divided test images can be performed concurrently; thus, long-length sheets, which are generally hard to sort, can easily be sorted and the upper limit of the sheet length in which sorting can be completed in time can be raised.

Regarding division of the image reading result, the read image can be divided upon completion of reading and a determination can then be made; alternatively, an image read in the middle of reading can be regarded as a division image and determination can then be started.

Figure 6:
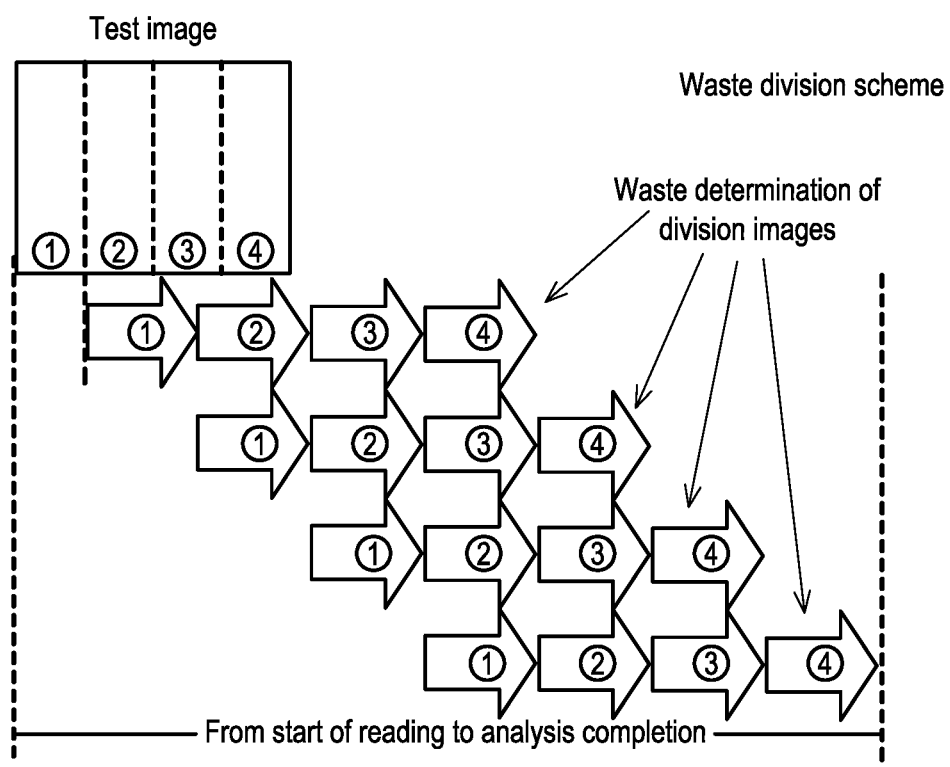
FIG. 6 is a flow diagram showing a procedure of waste determination in one embodiment of the present invention.

FIG. 6 is a flow diagram showing a state in which waste determination is performed by dividing a test image.

The test image is divided into four images. Once it is divided, the division images are subjected to waste determination. During waste determination, the first, second, third, and fourth contents are sequentially processed and determination processing for the respective division images are concurrently performed. The time required for completing determination can be made shorter than that in the case where a test image is not divided, allowing processing to be performed such that sorting can be done in time. According to the description in this example, determination processing is performed on the entire test image; alternatively, if determination processing for a division image determines that the image has abnormality, control can be exercised such that waste determination is regarded as being completed and sorting is started in process of determination without performing determination processing on the entire test image.

According to the description in this example, sheets with normal images and sheets with abnormal images are sorted into different paper output trays; alternatively, they can be ejected to the paper output tray but different positions. For example, positions where sheets are ejected can be shifted or the positions can be changed by rotating sheets. In addition, upon sorting, in case of waste paper, an insertion sheet or the like can be supplied for performing sorting. Alternatively, sorting is not limited to paper ejection and can be processing for just distinguishing them from each other.

In addition, according to the above description, waste determination is performed on divided test images through the same processing content; alternatively, in the present invention, division images may be subjected to processing in different procedures. Further, in the case where determination processing is performed through multiple contents, the order of determination contents can be changed depending on whether the determination results show a difference between frequencies of occurrence of a waste. For example, processing contents with high frequencies are performed first; thus, in the event of a waste, determination can possibly be performed in an early stage.

Further, in dividing an image, a predetermined number into which the image is divided should be used. The division number can be set to a pre-fixed division number, calculated depending on the image size and the sheet length in the transportation direction, or set through job settings. Alternatively, the division number can be set by the user through the operation display unit or the like.

Figure 7:
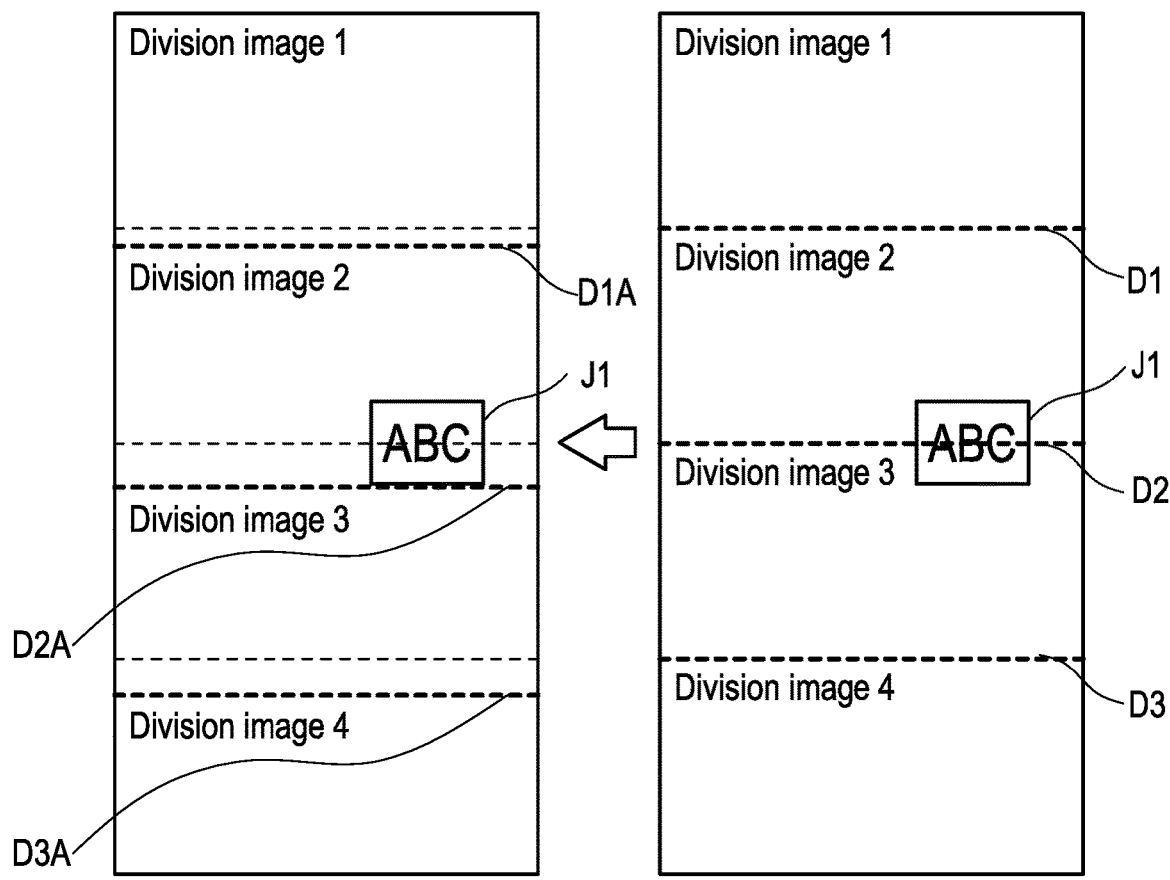
FIG. 7 is a diagram showing the state where a non-divisible area is disposed across division areas and an example in which the division areas are changed to avoid it.

Next, as shown in the drawing on the right of FIG. 7, when the test image includes an information area J1, such as a bar code, a QR code (TM), an OCR area, a user-designated area, or a correction image, division processing (measure 1) is performed which divides the image in such a manner that the information area is not divided. This is because dividing an information area causes a loss of necessary information and makes it difficult to perform desired processing. In this example in which division boundaries D1, D2, and D3 are provided across four division areas, in order to prevent the division boundaries D1, D2, and D3 from overlapping the information area J1, new division boundaries D1A, D2A, and D3A are provided as shown in the drawing on the left of FIG. 7, thereby enabling code/character discrimination and inspection in the information area without causing a division boundary to overlap the information area J1. In this example, an information area corresponds to a non-divisible area of the present invention.

Figure 8:
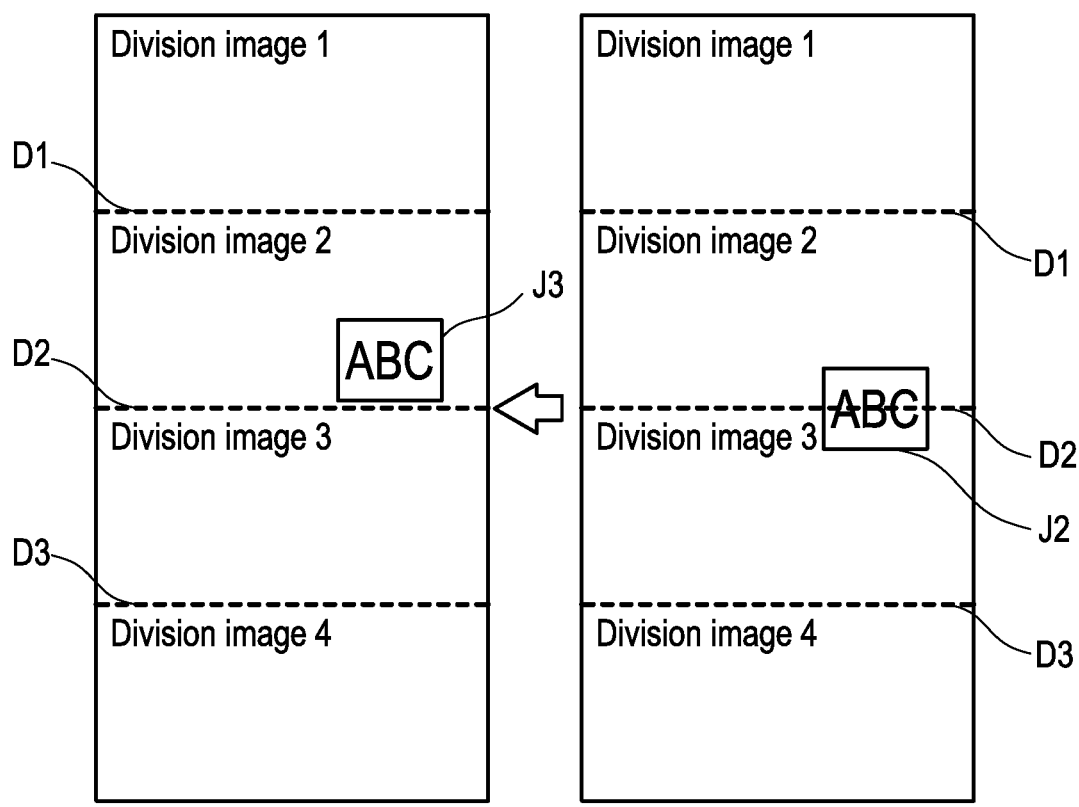
FIG. 8 is a diagram showing the state where non-divisible information is disposed across division areas and an example in which the position of the non-divisible information is changed to avoid it.

Like FIG. 7, the drawing on the right of FIG. 8 shows the state where an information area J2 which is a bar code, a QR code, a user-designated area, a correction image or other position-changeable variable information is disposed across division areas. In other words, among the division boundaries D1, D2, and D3, the division boundary D2 overlaps the information area J2. In this state, if division image determination is performed, information within the information area J2 is inevitably divided.

As a countermeasure, when the variable information is depicted, in order to prevent an information area from overlapping a boundary, variable information is provided in the form of an information area J3 (measure 2) as shown in the drawing on the left of FIG. 8. Any of the division boundaries D1, D2, and D3 does not overlap the information area J3, so that code/character discrimination and inspection in the information area J3 can be achieved. Variable information can also be treated as non-divisible information.

Image division is first performed with a printing control unit 1060 shown in FIG. 3 using the division width of a correct image by the measure 1 or 2. Next, a test image is divided with an ILS control unit 1010 in accordance with the division width.

The division method is not necessarily the measure 1 or 2: a large division area can be applied to an earlier part that has much capability and a small division area can be applied to a latter part. In addition, an image in a size of A3 or smaller, for example, is not divided because it can be in time for purge processing without division. When the division area is too small or divided into too many areas, displacement correction is difficult if a waste is present across the areas; for this reason, division is not preferably performed more than necessary.

Regarding long-length sheets, for example, a delay in purge occurs even with a division scheme, or an OCR area, a bar code, or a user-designated area disposed on the entire area hinders the application of a division scheme in some cases. In this case, a partition sheet to be ejected in a normal manner is inserted to facilitate removal of waste paper. In the event of a waste, the subsequent sheet is already fed; therefore, during the time from the occurrence of a waste to a partition sheet, 1. The subsequent sheet that has been already fed is purged to a different tray and a partition sheet is ejected on waste paper.
2. Alternatively, since purge of the subsequent sheet that has been already fed results in spoiled paper, a mode can be employed in which the subsequent sheet that has been already fed is subjected to normal printing and is ejected in a normal manner and the message "Remove the sheet before the last four", for example, is then printed on a partition sheet which is then ejected.

A procedure in which a test image can be divided and waste determination is achieved will now be explained with reference to the flow chart of FIG. 9. It should be noted that the following procedure is executed under control by the control unit or inspection controller.

Upon initiation of processing, whether an output sheet with an image formed thereon is in an output sheet size supported for switching the output tray from a normal paper output tray to a purge tray through sorting is determined in the printing control unit (Step s1).

Lengths supported for purge, which can be checked in advance, can be stored in a nonvolatile memory or HDD as setting data and read for use in determination.

If the output sheet has a length supported for purge (Step s1, Yes), a conventional waste inspection method which does not involve test image division is executed (Step s8). If the image on the output sheet is normal according to the results of the inspection in Step s8 (Step s8, OK), normal paper ejection is performed (Step s7) and the processing ends.

If the image on the output sheet is determined to be abnormal (waste paper) according to the results of the inspection in Step s8 (Step s8, NG), the output sheet that has been determined to be waste paper undergoes sorting and is ejected through purge processing (Step s9). It should be noted that sorting can be performed in such a manner that normal output sheets and abnormal output sheets are ejected to the same paper output tray but different positions or an insertion sheet is inserted. After purge processing, the processing ends.

In Step s1 in which whether the output sheet has a length supported for purge is determined, if the output sheet has a length that is not supported for purge (Step s1, No), the division size that does not cause a delay in paper ejection switching is calculated (Step s2). The division size can be calculated based on the sheet length in the transportation direction, the image reading area, and the like. Parameters serving as criteria for calculation are stored in a memory or the like in advance and calculation is performed based on the parameters. For example, a sheet length, image size, and the like which serve as limitations for a single division image can be used as parameters for calculation.

After calculation of the division size, reading of the test image is started in the image reading unit (Step s3) and whether the division size calculated in Step s3 has been reached is judged (Step s4). If the division size is not reached (Step s4, No), the processing returns to Step s4 for judging again whether the division size has been reached.

If the read test image reaches the division size in Step s4 (Step s4, Yes), waste inspection is performed on the areas of division images (Step s5). As shown in FIG. 6, in this processing, determination processing can be concurrently performed for the division areas. With a multicore CPU, parts of processing can be assigned to the respective cores and performed concurrently.

If the image has abnormality in Step s5 (Step s5, NG), purge processing is performed (Step s9) and the processing then ends.

If the image is normal according to waste inspection for division images (Step s5, OK), whether the entire image, that is, down to the final area of the division images has been read is judged (Step s6). If the entire image has been read (Step s6, Yes), no waste was detected in the entire image and normal paper ejection is performed (Step s7). Then, the processing ends. If the entire image has yet to be read (Step s6, No), there is a remaining area to read and the processing returns to Step s4 for judging again whether the next division size has been reached.

Through this procedure, waste determination can be performed for each division image for output sheet sorting.

In this procedure, waste determination is performed for each division size and judgement for sorting is performed for each division image; alternatively, output sheet sorting can be performed after reading the entire image.

Figure 9:
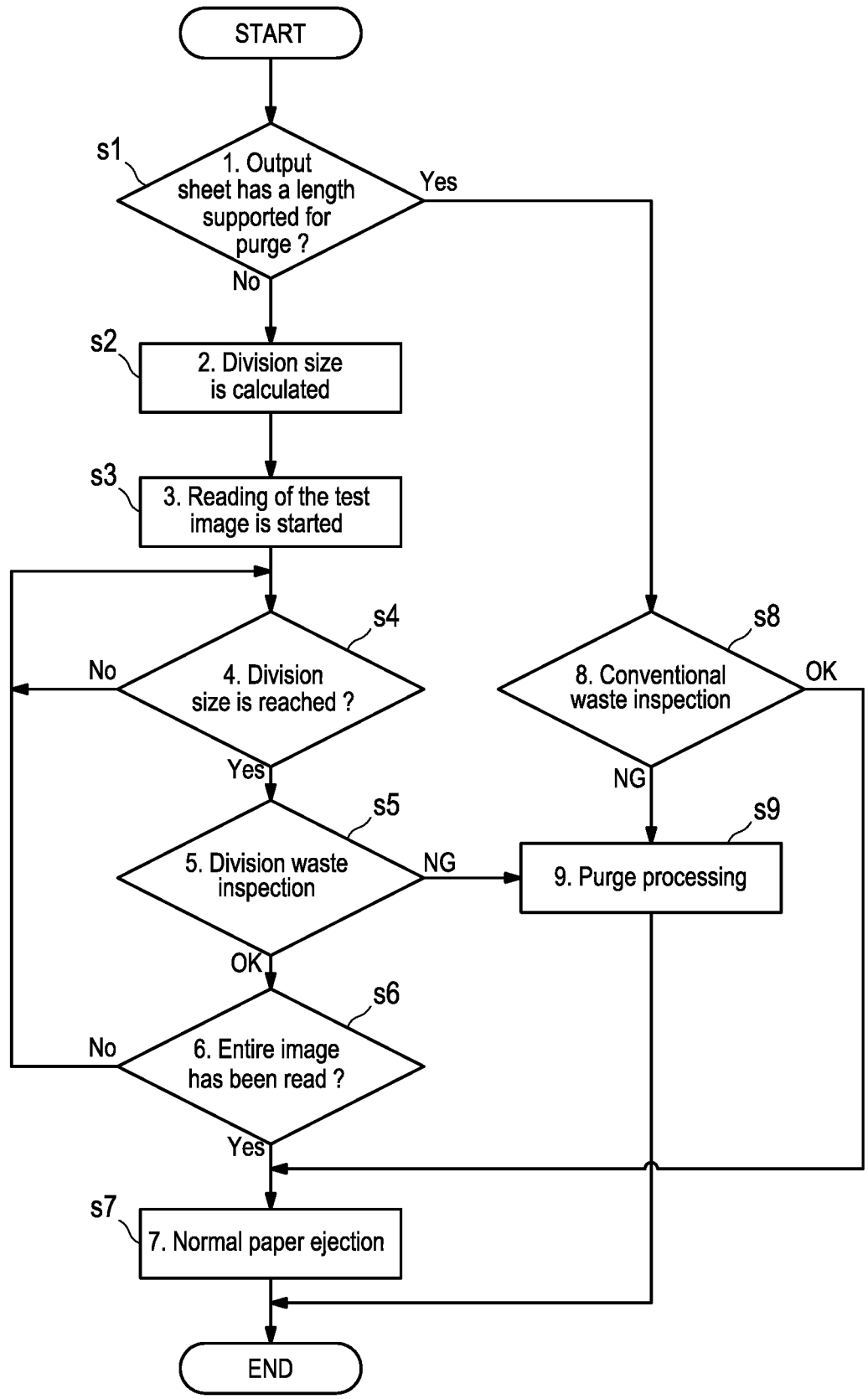
FIG. 9 is a flow chart showing a procedure in which waste determination is achieved by dividing a read image, according to one embodiment of the present invention.
Figure 10:
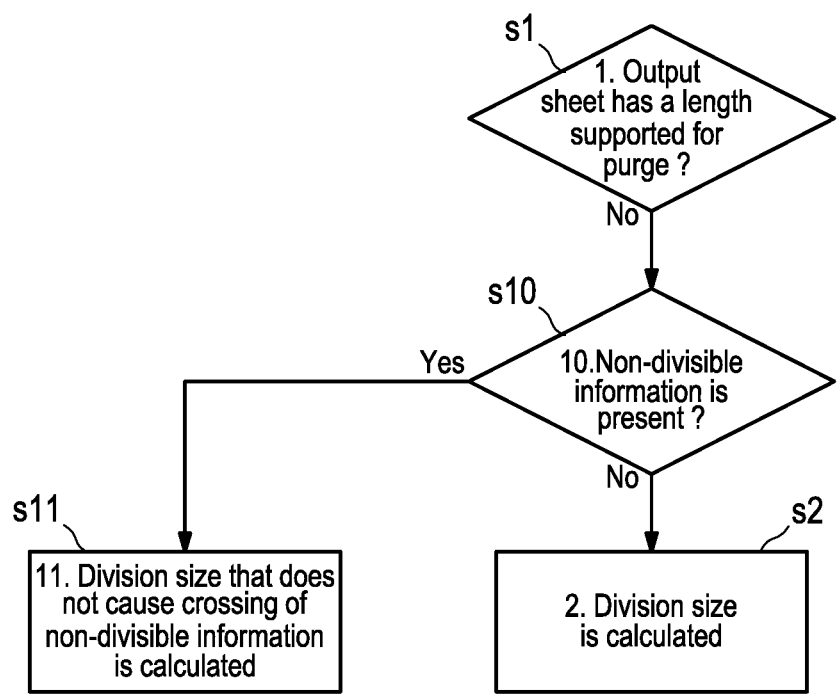
FIG. 10 is a flow chart showing a procedure of division area calculation performed when a read image contains non-divisible information, according to another embodiment.

A modified procedure will now be explained in which the division size is calculated in case of presence of a non-divisible area in an image to be read, with reference to the flow chart of FIG. 9 and the flow chart of FIG. 10 showing additional steps. The procedure below is executed under control by the control unit or inspection controller.

First, like in the aforementioned Step s1, whether the output sheet has a length supported for purge is determined (Step s1) and if the output sheet has a length supported for purge, conventional waste inspection is performed as explained for the aforementioned procedure. If the output sheet has a length that is not supported for purge (Step s1, No), presence/absence of non-divisible information is determined (Step s10). An example of non-divisible information is an indicator of an information area. In Step s10, presence/absence of non-divisible information, such as a bar code, a QR code, a user-designated area, and a correction image, is checked. In the present invention, non-divisible information may be other than an information area.

In the case of absence of non-divisible information (Step s10, No), the division size is calculated like in the aforementioned procedure (Step s2). In the case of presence of non-divisible information (Step s10, Yes), the division size that does not cause crossing of non-divisible information is calculated (Step s11). The rest of the procedure can be performed in the same manner as in the aforementioned procedure.

Figure 11:
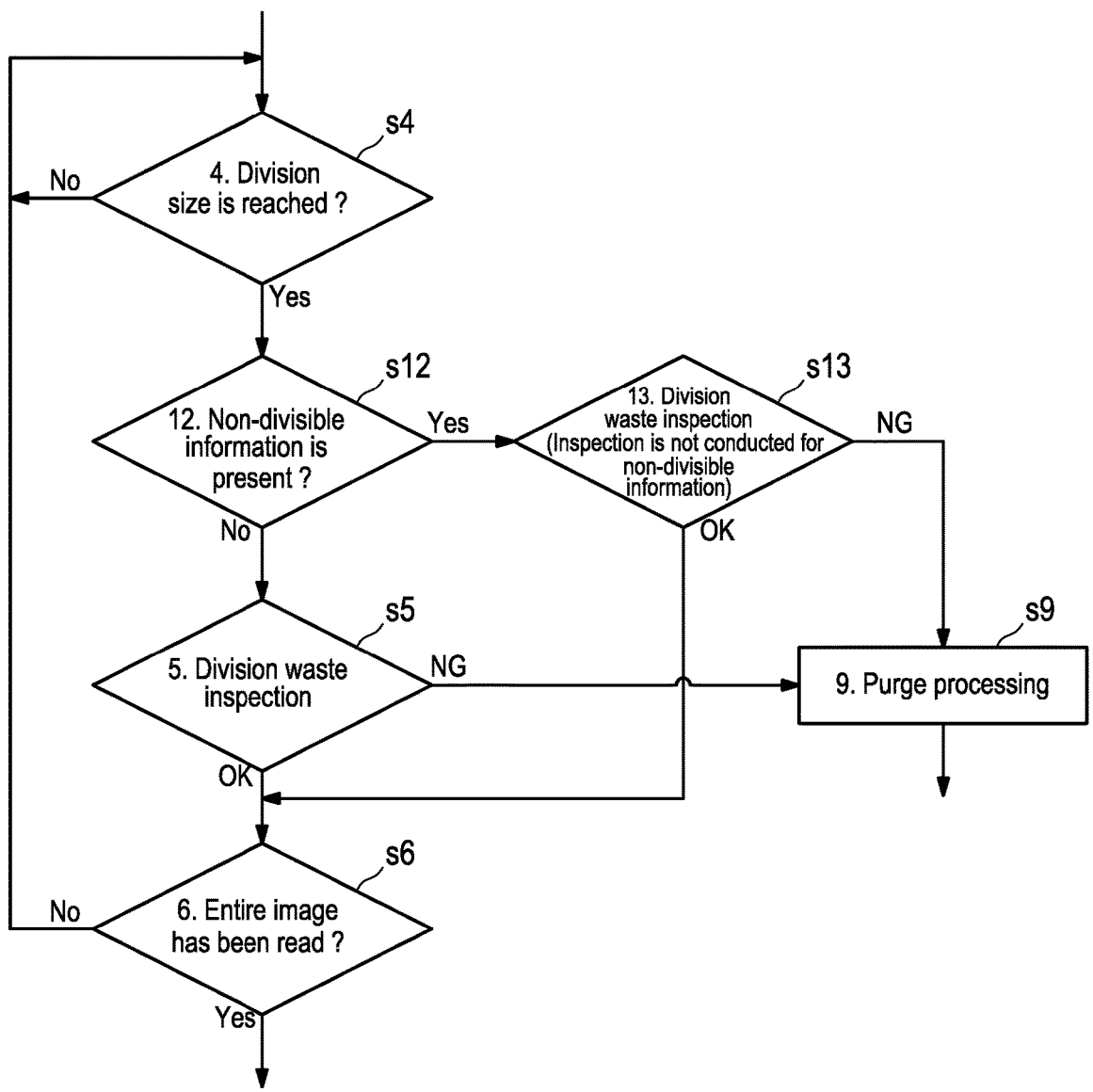
FIG. 11 is a flow chart showing a procedure in which, when a read image contains non-divisible information, waste determination is performed by removing non-divisible information, according to still another embodiment.

A procedure will now be explained in which, in case of presence of non-divisible information, such as a bar code, a QR code, a user-designated area, or a correction image in an image to be read, waste determination is not performed for non-divisible information, with reference to the flow chart of FIG. 9 and the flow chart of FIG. 11 showing additional steps. The procedure below is executed under control by the control unit or inspection controller.

First, in Step 4, whether a read area has reached a division size is determined. If the division size is not reached (Step s4, No), whether the division size has been reached is determined again. If the division size is reached (Step s4, Yes), presence/absence of non-divisible information is judged (Step s12). If non-divisible information is absent (Step s12, No), as described in the procedure related to FIG. 9, division waste inspection is conducted (Step s5). If it is determined that a waste is present (Step s5, NG), purge processing is performed (Step s9), and if the image is determined to be normal (Step s5, OK), whether the entire image has undergone the inspection is determined (Step s6). If not the entire image has undergone the inspection (Step s6, No), the processing returns to Step s4 and whether the division size has been reached is determined again. If the entire image has undergone the inspection (Step s6, Yes), normal paper ejection is performed as shown in FIG. 9 (Step s7).

If Step s12 judges that non-divisible information is present (Step s12, Yes), inspection is not conducted for non-divisible information, such as a bar code, a QR code, a user-designated area, or a correction image, but division waste inspection is conducted for other division images (Step s13). If it is determined that there is a waste according to the results of division waste inspection, (Step s13, NG), purge processing is performed (Step s9), and if the image is determined to be normal (Step s13, OK), whether the entire image has undergone the inspection is determined (Step s6).

Figure 12:
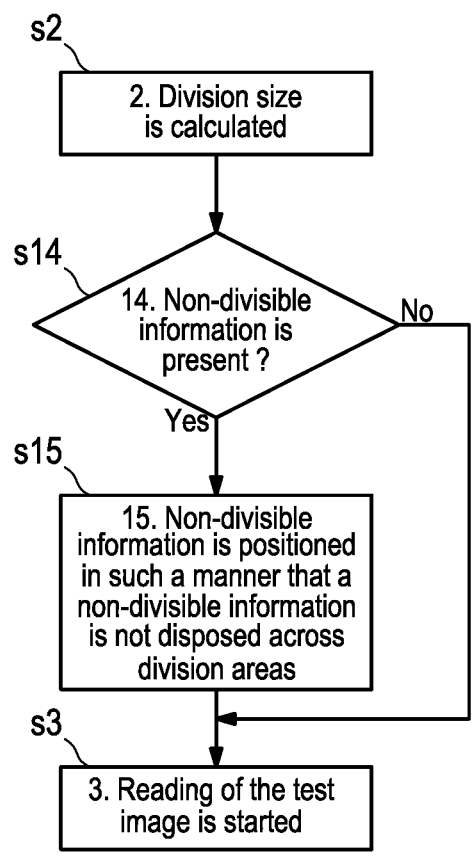
FIG. 12 is a flow chart showing a procedure in which, when a read image contains non-divisible information, the position of the non-divisible information is changed, according to yet another embodiment.

A procedure will now be explained in which, in case of presence of a non-divisible information in an image to be read, the position of the non-divisible information is changed, with reference to the flow chart of FIG. 9 and the flow chart of FIG. 12 showing additional steps. The procedure below is executed under control by the control unit or inspection controller.

After the division size is detected in Step s2 in the aforementioned flow, presence/absence of non-divisible information that is variable information, such as a bar code or QR code, in a test image is judged (Step s14). If non-divisible information is absent (Step s14, No), reading of a test image is started like in the aforementioned flow (Step s3). If non-divisible information that is variable information, such as a bar code or QR code, is present (Step s14, Yes), non-divisible information is positioned in such a manner that a non-divisible information is not disposed across division areas and a final image for inspection is created (Step s15). The processing then proceeds to Step s3 and reading of a test image is started. Afterwards, the procedure shown in FIG. 9 is conducted.

Figure 13:
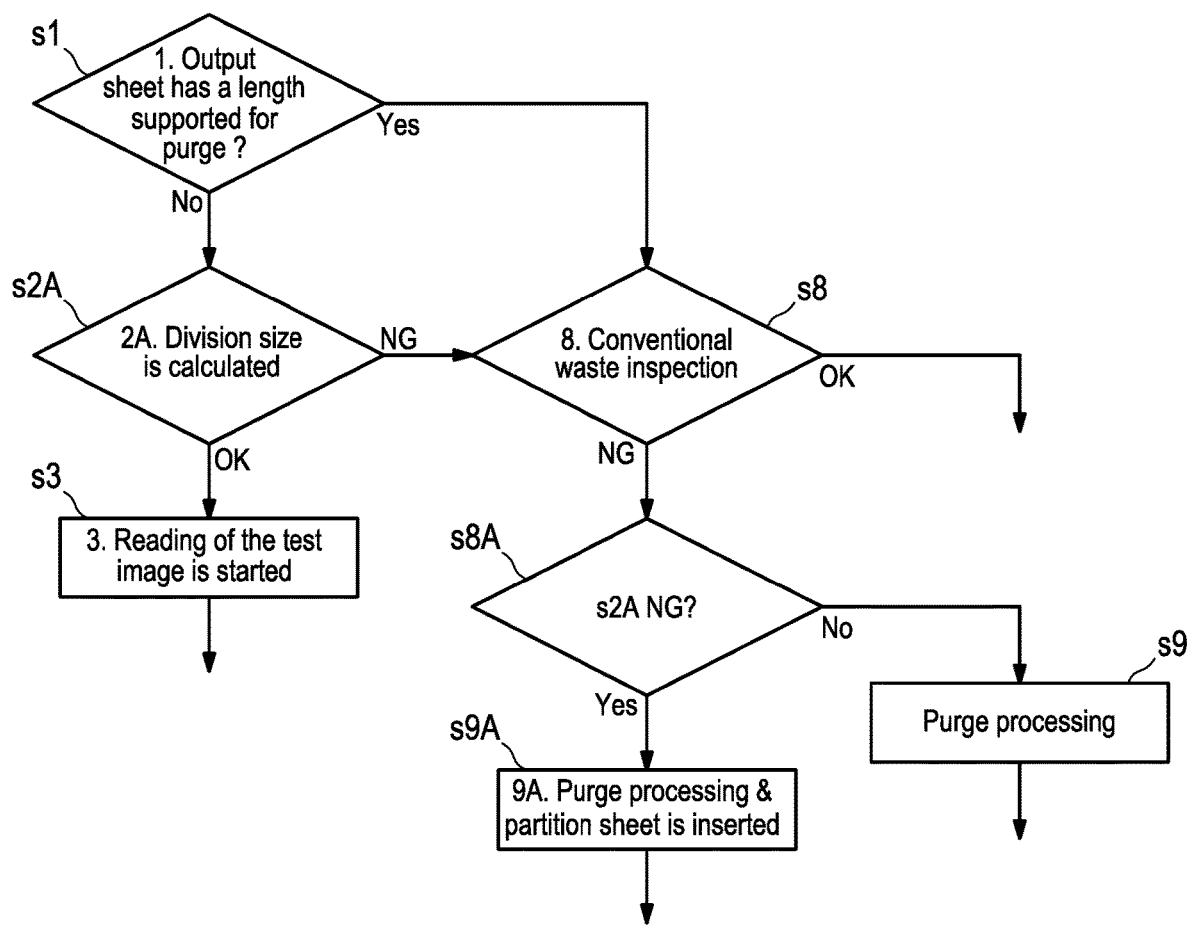
FIG. 13 is a flow chart showing a procedure in which, when a delay in sorting occurs even if a read image is divided, a partition sheet is ejected, according to a further embodiment.

A procedure will now be explained in which a delay in sorting occurs even if a test image is divided or a division image cannot be divided in some cases, with reference to the flow chart of FIG. 9 and the flow chart of FIG. 13 showing additional steps. The procedure below is executed under control by the control unit or inspection controller.

First, in Step s1 shown in FIG. 9, whether the length of an output sheet is supported for purge is determined.

If the output sheet has a length that is not supported for purge (Step s1, No), whether the division size is calculated and sorting can be completed in time is judged (Step s2A). If the division size can be calculated and a delay in sorting does not occur (Step s2A, OK), reading of a test image is started (Step s3) and the procedure shown in FIG. 9 is then performed.

If the output sheet has a length that is supported for purge (Step s1, Yes), the division size cannot be calculated, or a delay in sorting occurs (Step s2A, NG), conventional waste inspection is conducted (Step s8). If conventional waste inspection determines that the image is normal (Step s8, OK), normal paper ejection is performed (Step s7).

If conventional waste inspection determines that waste paper is present (Step s8, NG), whether NG was selected in Step s2A is judged (Step s8A). If it is determined that NG was not selected in Step s2A (Step s8A, No), normal purge processing is performed (Step s9). If it is determined that NG was selected in Step s2A (Step s8A, Yes), it is too late for purge processing; therefore, purge processing is performed in which waste paper is ejected to a normal paper output tray and the subsequent sheet that has been already fed is ejected to a purge paper output tray. Further, a partition sheet is inserted to a normal paper output tray (Step s9A) and the processing ends.

Figure 14:
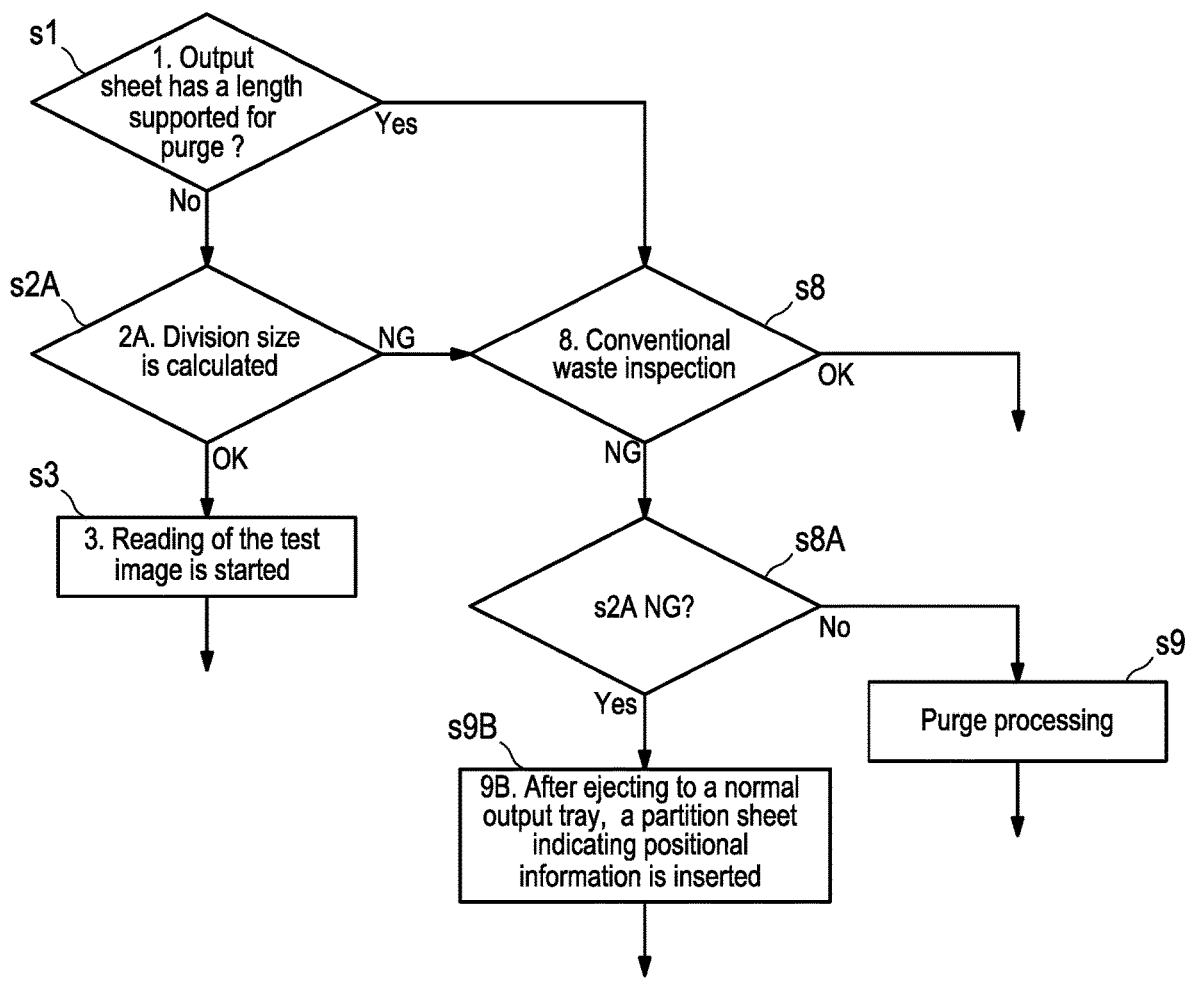
FIG. 14 is a flow chart showing a procedure in which, when a delay in sorting occurs even if a read image is divided, a partition sheet added with positional information about waste paper is ejected, according to a still further embodiment.

A procedure will now be explained in which a delay in sorting occurs even after division or division cannot be achieved in some cases and the subsequent sheet can be subjected to image formation and ejected in a normal manner, with reference to the flow chart of FIG. 9 and the flow chart of FIG. 14 showing additional steps. The procedure below is executed under control by the control unit or inspection controller.

First, in Step s1 shown in FIG. 9, whether the length of an output sheet is supported for purge is judged.

If the output sheet has a length that is not supported for purge (Step s1, No), whether the division size is calculated and sorting can be completed in time is judged (Step s2A). If the division size can be calculated and sorting can be completed in time (Step s2A), reading of a test image is started (Step s3) and the procedure shown in FIG. 9 is then performed.

If the output sheet has a length that is supported for purge (Step s1, Yes), the division size cannot be calculated, or a delay in sorting occurs (Step s2A, NG), conventional waste inspection is conducted (Step s8). If conventional waste inspection determines that the image is normal (Step s8, OK), normal paper ejection is performed (Step s7).

If conventional waste inspection determines that waste paper is present (Step s8, NG), whether NG was selected in Step s2A is judged (Step s8A). If it is determined that NG was not selected in Step s2A (Step s8A, No), normal purge processing is performed (Step s9). If it is determined that NG was selected in Step s2A (Step s8A, Yes), waste paper is ejected to a normal output tray, the subsequent sheet that has been already fed is ejected in a normal manner, and a partition sheet printed with a message indicating positional information about waste paper, such as "The sheet before the last four is waste paper", is then inserted (Step s9B). Then, the processing ends.

As described above, in the image reading unit in this embodiment, division reading is performed on long-length sheets and waste detection processing is sequentially performed on each division area. Waste determination can be performed in an earlier stage than in the case where division reading is not performed. Consequently, long-length waste paper can be ejected to a different tray.

If a bar code, a QR code, characters to undergo OCR, important information designated by the user, such as a company logo or a human face, or a correction image, such as a crossmark or patch, is disposed across division areas, accurate waste detection may be hindered disadvantageously. In this case, a countermeasure is imposed to prevent the information from being disposed across division areas.

In some cases, a delay in the switching occurs and ejection to a different tray cannot be achieved when a waste is detected in the division area in the last half, or division cannot be achieved because a bar code, a QR code, characters to undergo OCR, or important information is printed on the entire surface. In these cases, a countermeasure to insert an insertion sheet or partition sheet is taken.

According to the embodiments, the reading result for a single recording medium is divided and the image on the recording medium can be subjected to determination according to the reading result of each segment obtained by division; therefore, determination can be rapidly performed independently of the length of the recording medium and the recording medium that has undergone image determination can be effectively sorted.

Although the present invention has been described based on the aforementioned embodiments, the present invention is not limited to the aforementioned description and appropriate modifications of the aforementioned embodiments can be made without departing from the scope of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming device comprising:
   an image forming unit that forms an image on a recording medium; and
   a controller that controls image formation, wherein
   the controller determines whether the image on the recording medium is normal upon reception of a reading result obtained by reading the image passed through the image forming unit, exercises such control that a recording medium with an image that has been determined to be normal and a recording medium with an image that has been determined to be abnormal are sorted according to a determination result, and performs judgement related to division of the reading result, depending on whether the determination is completed before recording medium sorting, and
   the controller, upon such reading, divides the reading result related to the recording medium, makes a determination on the image on the recording medium in accordance with reading results related to segments obtained by division.

2. The image forming device according to claim 1, wherein the controller concurrently makes the determination for each segment obtained by division.

3. The image forming device according to claim 1, wherein, at the time of the determination for each segment obtained by division, the controller determines that the image is abnormal depending on a determination result for a segment obtained by division, before completion of determination for all reading results.

4. The image forming device according to claim 1, wherein, before division, the controller determines whether division needs to be performed, depending on at least one matter selected from the group consisting of the transportation-direction length of the recording medium to be read, image reading time, the number of determination processing parts, and the type of the determination processing.

5. The image forming device according to claim 4, wherein, before division, the controller determines whether division needs to be performed, depending on at least one matter selected from the group consisting of the transportation-direction length of the recording medium to be read, image reading time, the number of times determination is performed, and the type of determination, and if it is determined that division needs to be performed, the controller determines a division number in accordance with the at least one matter depending on which whether division needs to be performed is determined.

6. The image forming device according to claim 1, wherein, the controller is capable of changing the order of multiple processing parts when the determination involves sequential execution of multiple processing parts.

7. The image forming device according to claim 6, wherein, in the determination, the controller changes the order of multiple processing parts in such a manner that time priority is given to a processing part with relatively high frequency of the determination that the image is abnormal.

8. The image forming device according to claim 1, wherein, at the time of the sorting, the controller ejects recording mediums with normal image determinations and recording mediums with abnormal image determinations to different paper output trays.

9. The image forming device according to claim 1, wherein, at the time of the sorting, the controller ejects recording mediums with normal image determinations and recording mediums with abnormal image determinations to the same paper output tray but different positions.

10. The image forming device according to claim 1, wherein, when the image on the recording medium contains an area of non-divisible information, at the time of the division, the controller performs such division that a division boundary does not overlap the area of the non-divisible information.

11. The image forming device according to claim 10, wherein the non-divisible information is an information area.

12. The image forming device according to claim 11, wherein the information area is one or more of bar code information or character information, user-designated area, and a correction image.

13. The image forming device according to claim 10, wherein the controller does not perform determination for the non-divisible information.

14. The image forming device according to claim 1, wherein, when the image to be formed on the recording medium contains variable information, the controller disposes an image related to variable information in a position where a division boundary does not exist.

15. The image forming device according to claim 1, wherein, when a recording medium is determined to have an abnormal image during the determination and the determination is not completed before sorting of the recording medium, the controller sorts the recording medium that has been determined to have the abnormal image, in the same manner as for a recording medium with a normal image, sorts the subsequent recording medium that has been already fed, in the same manner as for a recording medium with an abnormal image, and supplies a partition recording medium that follows the recording medium with the abnormal image.

16. The image forming device according to claim 1, wherein, when a recording medium is determined to have an abnormal image during the determination and the determination is not completed before sorting of the recording medium, the controller sorts the recording medium that has been determined to have the abnormal image, in the same manner as for a recording medium with a normal image, allows the subsequent recording medium that has been already fed to be image-printed and sorted in the same manner as for a recording medium with a normal image, and supplies and ejects a partition recording medium that follows the recording medium with the abnormal image, the partition recording medium being printed with positional information about the recording medium with the abnormal image.

17. An image inspection device comprising:
an inspection controller that determines, in accordance with a reading result obtained in an image reader that reads an image on a recording medium, whether the image on the recording medium is normal, wherein
the inspection controller sorts a recording medium with an image that has been determined to be normal and a recording medium with an image that has been determined to be abnormal according to a determination result, performs judgement related to division of the reading result, depending on whether the determination is completed before recording medium sorting, and, upon such reading, divides the reading result related to the recording medium and makes a determination on the image on the recording medium in accordance with reading results related to segments obtained by division.

18. A non-transitory computer-readable storage medium storing a program to be executed on a computer that determines whether an image on a recording medium is normal in accordance with a reading result obtained by reading the image on the recording medium through an image reader, wherein
the program causes the computer to perform:
judging whether the reading result related to the recording medium needs to be divided,
dividing the reading result into multiple reading results when division needs to be performed according to the judgement,
making a determination on the image on the recording medium in accordance with the reading results obtained after division,
exercising such control that, a recording medium with an image that has been determined to be normal and a recording medium with an image that has been determined to be abnormal are sorted depending on the result of the determination, and
performing judgement related to division of the reading result, depending on whether the determination is completed before recording medium sorting.

* * * * *